(12) United States Patent
Zhai et al.

(10) Patent No.: US 11,461,877 B2
(45) Date of Patent: Oct. 4, 2022

(54) IMAGE INPAINTING METHOD, IMAGE INPAINTING SYSTEM AND FLAT PANEL DETECTOR THEREOF

(71) Applicant: IRAY TECHNOLOGY COMPANY LIMITED, Shanghai (CN)

(72) Inventors: Yongli Zhai, Shanghai (CN); Nan Zhang, Shanghai (CN); Zhiqiang Fang, Shanghai (CN)

(73) Assignee: IRAY TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/757,775

(22) PCT Filed: Feb. 21, 2019

(86) PCT No.: PCT/CN2019/075643
§ 371 (c)(1),
(2) Date: Apr. 22, 2020

(87) PCT Pub. No.: WO2020/118896
PCT Pub. Date: Jun. 18, 2020

(65) Prior Publication Data
US 2021/0295477 A1    Sep. 23, 2021

(30) Foreign Application Priority Data

Dec. 10, 2018 (CN) .......................... 201811502255.2

(51) Int. Cl.
| G06T 5/00 | (2006.01) |
| G06K 9/62 | (2022.01) |
| G06T 7/00 | (2017.01) |
| G06V 10/75 | (2022.01) |

(52) U.S. Cl.
CPC ............ *G06T 5/005* (2013.01); *G06K 9/6228* (2013.01); *G06T 7/0002* (2013.01); *G06V 10/751* (2022.01)

(58) Field of Classification Search
CPC ................ G06K 9/6202; G06K 9/6228; G06T 2207/10116; G06T 5/005; G06T 7/0002
See application file for complete search history.

(56) References Cited

U.S. PATENT DOCUMENTS

| 5,608,816 A * | 3/1997 | Kawahara ............ G01N 21/956 348/126 |
| 6,233,364 B1 * | 5/2001 | Krainiouk ................. G06T 7/12 382/254 |
| 6,950,547 B2 * | 9/2005 | Floeder .................. G01N 21/89 382/143 |

(Continued)

FOREIGN PATENT DOCUMENTS

CN    109934802 A *  6/2019

*Primary Examiner* — Ian L Lemieux

(57) ABSTRACT

The present disclosure provides an image inpainting method, an image inpainting system, and a flat panel detector. The method includes: acquiring a first image, performing connected domain analysis on the first image, and extracting the defective pixels in the first image; and classifying the defective pixels into isolated point defects, cluster defects, and bad line defects according to the size and shape of the connected domain; outputting a second image and inpainting the second image according to the type of the defective pixels. This method can not only effectively inpaint defective pixels, but also well preserve the details of the original image.

14 Claims, 8 Drawing Sheets

(56) References Cited

U.S. PATENT DOCUMENTS

| | | | |
|---|---|---|---|
| 8,798,373 B2* | 8/2014 | Shibata | H04N 1/4097 382/195 |
| 2007/0036420 A1* | 2/2007 | Enachescu | G09G 3/006 382/141 |

* cited by examiner

IMAGE INPAINTING METHOD, IMAGE INPAINTING SYSTEM AND FLAT PANEL DETECTOR THEREOF

CROSS REFERENCES TO RELATED APPLICATIONS

This is a National Stage application of PCT International Application No. PCT/CN2019/075643, filed on Feb. 21, 2019, which claims the benefit of priority to Chinese Patent Application No. CN201811502255.2, entitled "Image Inpainting Method, Image Inpainting System and Flat Panel Detector", filed with CNIPO on Dec. 10, 2018, the contents of which are incorporated herein by reference in its entirety.

TECHNICAL FIELD

The disclosure relates to the field of X-ray detectors imaging and image inpainting, and in particular, to an image inpainting method, an image inpainting system and a flat panel detector.

BACKGROUND

For X-ray flat panel detectors, in the production and assembly process of the detector, the detector inevitably produces defective pixels (bad pixels) during imaging due to various reasons, which cannot truly reflect the radiant energy received by the pixel unit when imaging. Defective pixels are detector units which do not respond to X-ray intensities or respond poorly. The main reasons for having defective pixels are defects of the scintillator layer, defects of the photodiodes and the thin film transistors, damages of the drive circuit, or poor connection of the detector plates. Depending on the response of defective pixels to the X-ray, the defective pixels can be classified into four types: dead pixel, under-reacted pixel, over-reacted pixel, and responsive chaotic pixel. According to the distribution of defective pixels in the image connected domain, the defective pixels can be classified into three types: isolated point defects, cluster defects and bad line defects. These defective pixels show different shapes when the detector is imaging, which not only reduces the factory yield of the detector, but also affects the judgment of the real situation of the photographed object.

At present, there are two main methods for eliminating defective pixels of detector: one is improving the detector producing procedure and process to reduce detector defective pixels, but the method is cumbersome, complicated and costly; the other is inpainting the image details at the detector defects as many as possible by using the image processing method. For example, an image processing method in current techniques mainly uses interpolation methods, such as the spline interpolation method, the bilinear interpolation method, and a cubic spline interpolation method, for inpainting defective pixels. These inpainting methods consider that the gray value of normal pixel points in the neighborhood of the defective pixels can restore the details of the image to some extent, but it may cause blur in the edge details, and does not consider the details such as the texture of images.

SUMMARY

The present disclosure provides an image inpainting method, an image inpainting system, and a flat panel detector to effectively impaint the image outputted by the detector and to persevere the details of the image.

According to a first aspect, the present disclosure provides an image inpainting method including the following steps: obtaining a first image; performing a connected domain analysis on the first image to extract defective pixels in the first image; classifying the defective pixels into three types according to the size and shape of the connected domain: isolated point defects, cluster defects, and bad line defects; outputting the second image and inpainting the second image according to the type of the defective pixel.

Preferably, the second image is sequentially inpainted in the order the isolated point defect, cluster defect, and bad line defect.

Preferably, the isolated point defect is inpainted by using the neighborhood weighted average method, and the inpainted pixel gray scale is shown as the following equation:

$$G(x, y) = \sum_{i,j \in N}^{N} F(i, j) * K(i, j)$$

F is the original image data of the isolated point defects, N is the number of the normal pixel points in the 3×3 pixel neighborhood of the isolated point defect, and K is the weighted average coefficient of the normal pixel point in the 3×3 pixel neighborhood of the isolated point defects.

Preferably, the source of the weighted average value includes: the gray scale distribution of the normal pixel points in the 3×3 pixel neighborhood, the gray scale distribution is calculated by a gray level gradient of the normal pixel point, the normal pixel point with a large gradient value has a large weighted coefficients, while the normal pixel point with a small gradient value has a small weighted coefficients; the position distribution of all the normal pixel points in the neighborhood of the 3×3 pixel, the position distribution is calculated by a distance from the normal pixel point to the isolated defect point, the weighted coefficient of the normal pixel point having short distance is high, while the weighted coefficient of the normal pixel point with a long distance is low.

Preferably, the cluster defect is inpainted by the method combining the level set with the template matching, the level set method determines the inpainting sequence of the bad pixels of the cluster defects; the template matching method inpaints the current bad pixel.

Preferably, determining the inpainting sequence of the bad pixels in the cluster defects includes the following steps: extracting the cluster defects and determining a defect boundary of the cluster defects, initializing the defect flag F and the arrival time T, and marking normal pixel points, edge points and defect points of the defects boundary; determining the edge point with the lowest T value in the defect boundary; determining the bad pixel in the 3×3 pixel neighborhood of the edge point with the lowest T value, and the bad pixel in the 3×3 pixel neighborhood of the edge point with the lowest T value is the current bad pixel required to be inpainted.

Preferably, inpainting the current bad pixel includes the following steps: selecting a target template using the current bad pixel as the center; selecting a search area using the current bad pixel as the center; selecting a searching template of the same size as the target template in the search area, and calculating the similarity between the target template and the searching template, and storing the calculation results; searching for the most similar data in the calculation results, and replacing the pixel value of the current bad pixel with the central pixel value of the search template corresponding to the data with the most similarity.

Preferably, the method further includes the following steps: determining whether the defect boundary is empty, if so, no inpainting is required; if not, performing an inpainting step, the inpainting step including determining the inpainting sequence of the bad pixels of the cluster defects and inpainting the determined bad pixel; performing the above determining step and inpainting step repeatedly until the defect boundaries become empty.

Preferably, the inpainting step further includes: updating the T value and the F value of the inpainted bad pixels after the inpainting of the determined bad pixels; adding the inpainted bad pixels into the defect boundary, and deleting the edge point with the lowest T of the defect boundary.

Preferably, the bad line defect is inpainted by the template matching method, and is inpainted according to the sequence of the stored position in the connected domain analysis of dead line defects.

Preferably, searching area avoids the area where the bad line defect is located when the bad line defect is inpainted, and the searching template changes adaptively according to the width of the bad line defects.

Preferably, the method further includes the step of performing background correction and gain correction on the second image before inpainting.

According to the second aspect, the present disclosure provides an image restore system, including: an image acquiring module, acquiring a first image; an image analysis module, performing connected domain analysis on the first image acquired by the image acquiring module, and extracting the defective pixels in the first image, wherein the pixels are classified into three types according to the size and shape of the connected domain: isolated point defects, cluster defects, and bad line defects; and an image inpainting module, inpainting the second image according to the type of the defective pixels determined by the image analyzing module.

Preferably, the image inpainting system further includes an image collecting module performing signal reading, amplification, and analog-to-digital conversion on the second image, and transmitting the amplified and converted image signals to the image inpainting module.

Preferably, the image inpainting system further includes an image preprocessing module, wherein the image preprocessing module includes a background correction module and a gain correction module, the background correction module performs the background correction on the second image, and the gain correction module perform the gain correction on the second image.

According to the third aspect, the present disclosure provides a flat panel detector including an image display module and the image inpainting system according to the above second aspect, and the image inpainting system is integrated in the flat panel detector, the image display module outputs and displays the images inpainted by the image inpainting system.

The image inpainting method, the image inpainting system and the flat panel detector provided by the disclosure have the following beneficial effects:

1. The method in the present disclosure performs statistics and analysis on defective pixels in a first image, such as a defect template in a detector, sorts the defective pixels, and inpaints the second image in the order of defective pixels from small to large. Different defective pixels are inpainted by different methods. The inpainting method takes into account the similarity of adjacent pixels and conforms to the distribution characteristics of the image gray scale, which not only can effectively inpaint the defective pixels, but also well preserve the details of the original images.

2. The method in the present disclosure performs pixel statistics and classification on the defect template in the detector, and inpaints the image outputted by the detector in real time according to the classification, so that the image defect pixel can be quickly inpainted.

3. The image inpainting method in the present disclosure only relates to the type of defective pixel, such as a dead pixel defect, a cluster defect, and a bad line defect, which can be used in flat panel detectors, so it can significantly improve work efficiency and reduce the labor costs.

4. The image inpainting system in the present disclosure can be integrated in a flat panel detector without required changes to the hardware design, which can reduce product cost and improve shipment yield. And in the subsequent upgrade and maintenance, only the software is required to be optimized and upgraded.

BRIEF DESCRIPTION OF THE DRAWINGS

The features and advantages of the present disclosure will be more clearly understood by reference to the accompanying drawings. The drawings are schematic and should not be construed as limiting the disclosure.

DETAILED DESCRIPTION OF THE PREFERRED EMBODIMENTS

The technical solutions in the embodiments of the present disclosure will be clearly and completely described in conjunction with the drawings in the embodiments of the present disclosure. Apparently, it is a partial embodiment of the disclosure, not all of the embodiments. All the embodiments obtained by a person skilled in the art based on the embodiments of the present disclosure without creative efforts are within the scope of the present disclosure.

Embodiment 1

Figure 1:
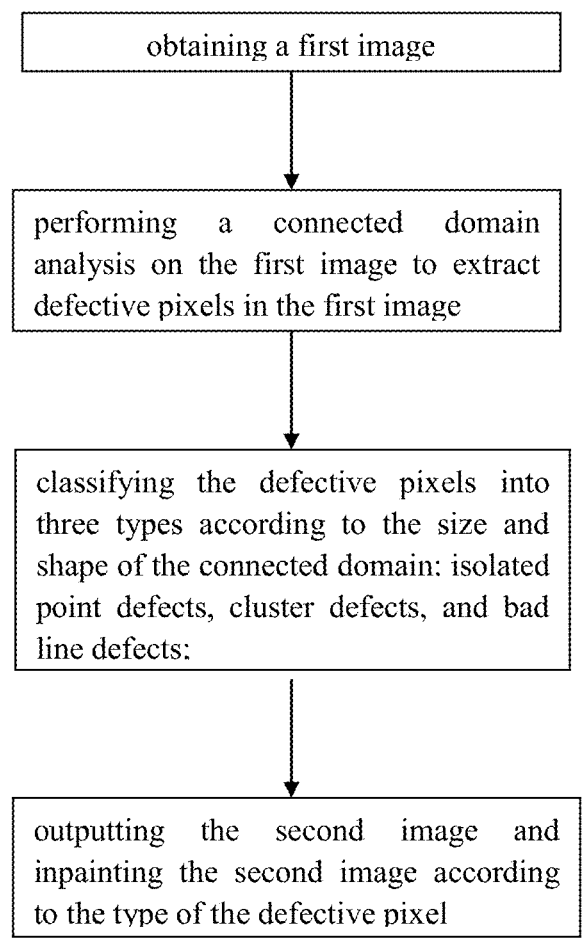
FIG. 1 is a flowchart of the image inpainting method according to embodiment 1 of the present disclosure.

The present embodiment provides an image inpainting method, as shown in FIG. 1, the method includes the following steps:
Obtaining a first image;
Extract all the defective pixels of the first image by performing a connected domain analysis on the first image;
Classifying the defective pixels into three types according to the size and shape of the connected domain: isolated point defects, cluster defects, and bad line defects;
Outputting the second image and inpainting the second image according to the type of the defective pixel.

In the present embodiment, the first image is preferably the defect template in an apparatus such as a detector.

In a preferred embodiment, the connected domain analysis is performed on the first image in the order from the left to the right and from the top to the bottom, such as the defect template described above.

In a preferred embodiment, according to the classification of the defective pixels, the isolated point defect inpainting, the cluster defect inpainting, and the bad line defect inpainting are sequentially performed on the second image from small to large according to the size of the defective pixels. Image inpainting in the sequence of small to large can achieve a good inpainting effect.

In a preferred embodiment, the background correction and the gain correction are firstly performed on the second image before inpainting.

The method of the embodiment performs pixel statistics and classification on the defect template for the first image. The second image outputted by detectors in real time is inpainted based on the classification, so that the image defect pixels can be quickly inpainted.

Embodiment 2

On the basis of embodiment 1, the present embodiment provides a method for inpainting isolated point defects. In the present embodiment, the isolated point is inpainted by using neighborhood weighted average method.

Since a single pixel does not contain many image details, the above-described neighborhood weighted averaging method is used in the preferred embodiment to achieve the inpainting of isolated point defects. The gray scale of the isolated point inpainted by the method is as shown in the following formula (1):

$$G(x, y) = \sum_{i,j \in N}^{N} F(i, j) * K(i, j), \quad (1)$$

F is the original image data in the 3×3 pixel neighborhood of the isolated point defects, N is the number of the normal pixel points in the 3×3 pixel neighborhood of the isolated point defect, and K is the weighted average coefficient corresponding to the normal pixel point in the 3×3 pixel neighborhood of the isolated point defect.

In a further preferred embodiment, the weighted average number mainly includes two sources: gray scale distributions of all the normal pixel points in the 3×3 pixels neighborhood, and position distributions of all the normal pixel points in the 3×3 pixels neighborhood.

The gray scale distributions of all the normal pixel points in the 3×3 pixels neighborhood are obtained by calculating the gray level gradient of the normal pixel point, the weighting coefficient of the normal pixel point having a high gradient value is high, and the weighting coefficient of the normal pixel point having a low gradient value is low.

The position distribution of all the normal pixel points in the 3×3 pixels neighborhood is calculated by calculating a distance from the normal pixel point to the isolated defect point, and the weighted coefficient of the normal pixel point having short distance is high, while the weighted coefficient of the normal pixel points having long distance is low.

As shown above, when the method for detecting the isolated point defect is performed, the gray scale distribution and the position distribution of the normal pixel point in the neighborhood of the defective pixel point are fully considered, and the weighted average corresponding to the normal pixel point is used to inpaint the isolated points. The method can effectively inpaint the isolated point defects, and can well restore the details of the original image.

Embodiment 3

Similar to embodiment 2, on the basis of embodiment 1, the present embodiment provides a method for inpainting cluster defects. In the present embodiment, the cluster defects are inpainted by combining the level set and the template matching. The level set method determines the inpainting sequence of the bad pixels in the cluster defects; the template matching method inpaintes the current bad pixels.

Figure 2:
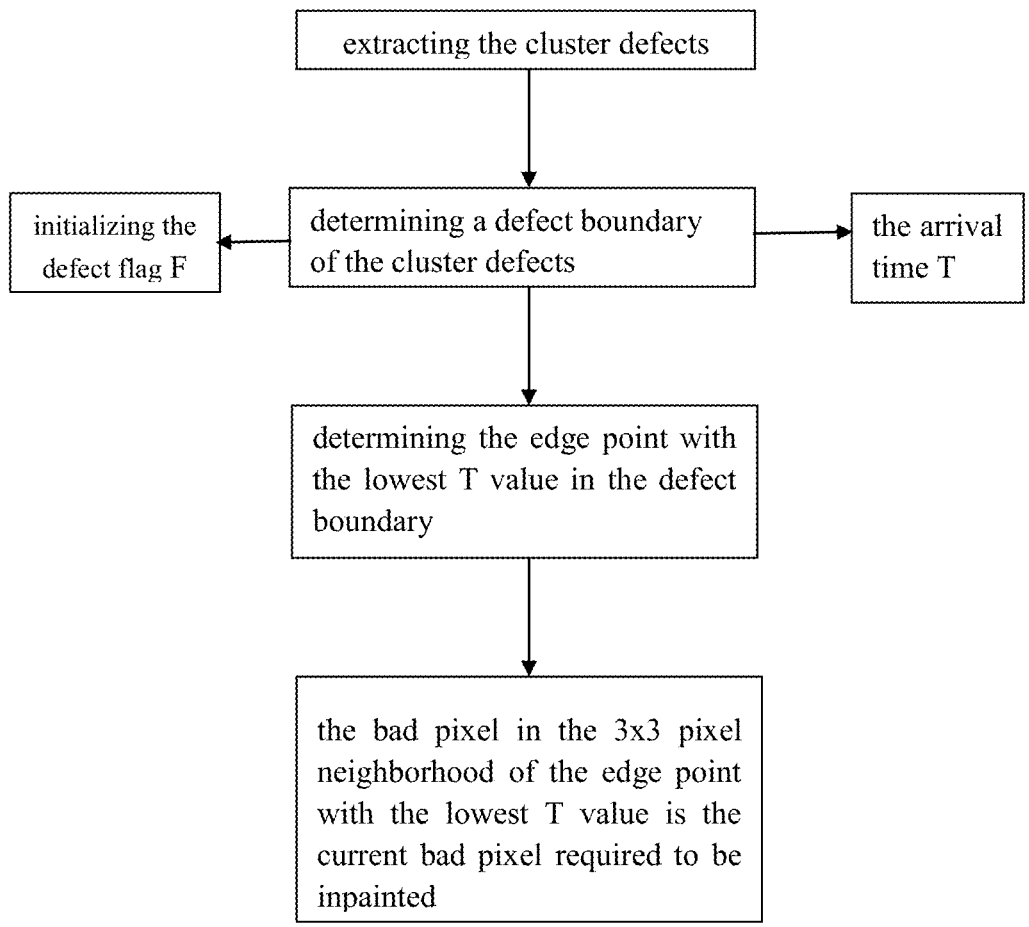
FIG. 2 is a flowchart showing the level set method in the method according to embodiment 3 of the present disclosure.

In a preferred embodiment, as shown in FIG. 2, determining the inpainting sequence of the bad pixels in the cluster defects by using a level set method includes the following steps: extracting the cluster defects and determining the defect boundary of the cluster defects, the initializing defect flag F and the arrival time T, and marking the normal pixel point, the edge point and the defect point of the defect boundary. The arrival time T is obtained based on the level set principle, and is used to determine the bad pixel to be inpainted at first in the cluster defects.

The bad pixel to be inpainted at first is determined by: determining the edge point of the defect boundary with the lowest T value; determining the bad pixel in a 3×3 pixel neighborhood of the edge point having the lowest T value, and the bad pixel in 3×3 pixel neighborhood of the edge point having the lowest T value is the current bad pixel required to be inpainted.

Figure 3:
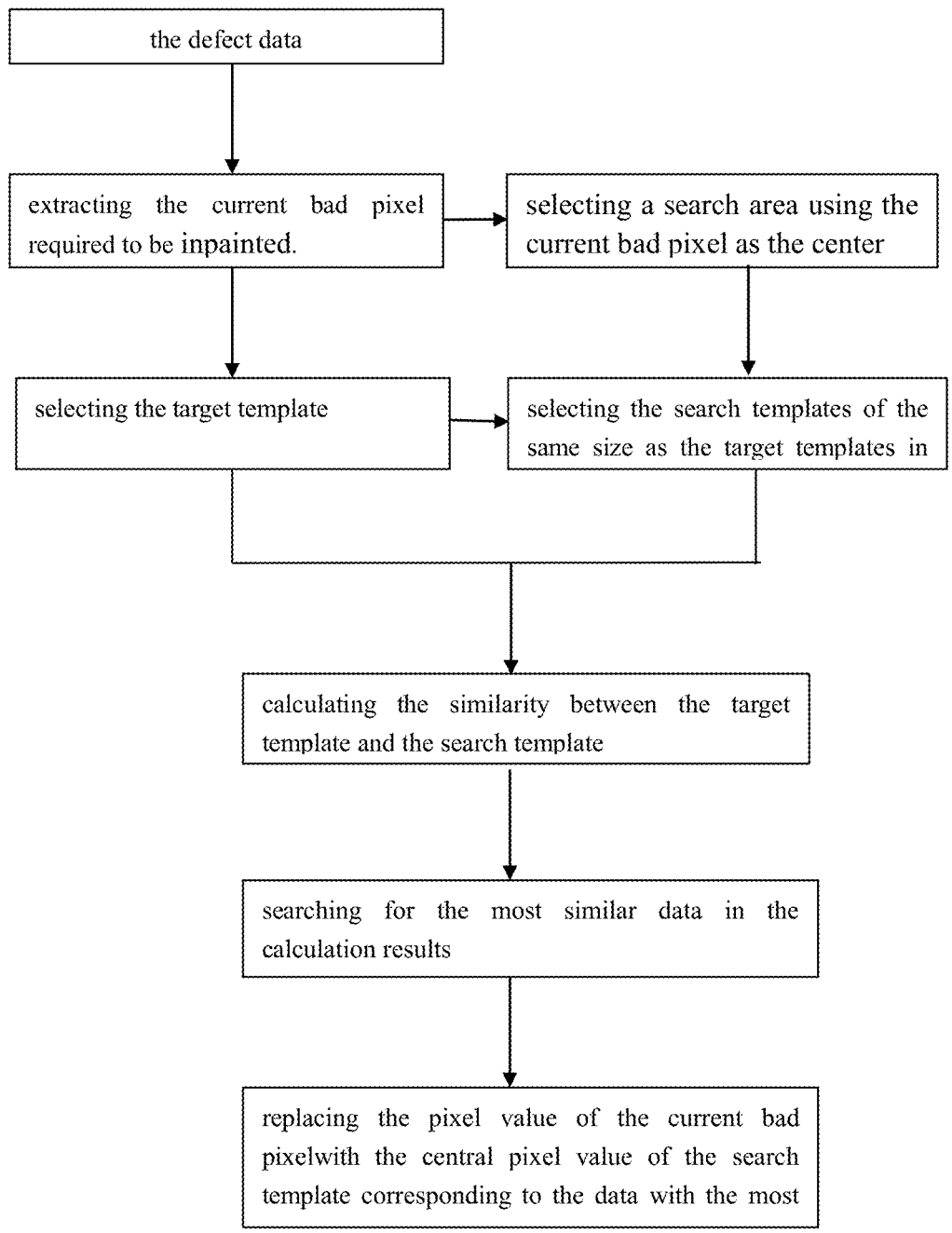
FIG. 3 is a flowchart of the template matching method in the method according to embodiment 3 of the present disclosure.

After the current bad pixel is determined, the current bad pixel is inpainted by using the template matching method. As shown in FIG. 3, the current bad pixel to be inpainted is extracted from the defect data. Then, as shown in FIG. 3, the target template is selected by using the determined current bad pixel as a center, a search area is arranged with the current bad pixel being used as the center. The search template having the same size as the target template is sequentially selected in the search area, and the similarity between the target template and the search template is calculated, and the result of the calculation is stored. Searching for the most similar data in the calculation result; finally, using the central pixel value of the search template corresponding to the data with the most similarity to replace the pixel value of the current bad pixel to complete the inpainting of the current bad point. The inpainting is performed on different dead pixels until the entire cluster defect is inpainted.

Figure 4:
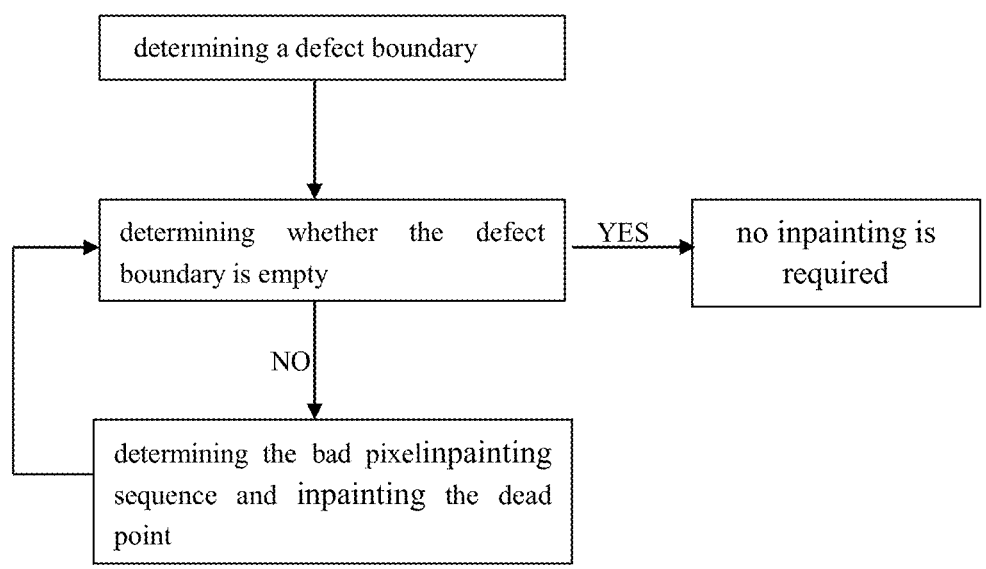
FIG. 4 is a flowchart showing the inpainting method of a preferred embodiment of embodiment 3 of the present disclosure.

In another preferred embodiment, as shown in FIG. 4, the method for inpainting cluster defects further includes the following steps: after determining a defect boundary of the cluster defect, determining whether the defect boundary is empty. If so, it is indicated that the defect boundary does not need to be inpainted; if not, performing the inpainting step. The inpainting step includes the process of determining inpainting sequence of the bad pixel in the cluster defects in FIG. 2 and the inpainting process for the determined bad pixel shown in FIG. 3. Above determining steps and inpainting steps are repeated until the defect boundaries become empty.

Figure 5:
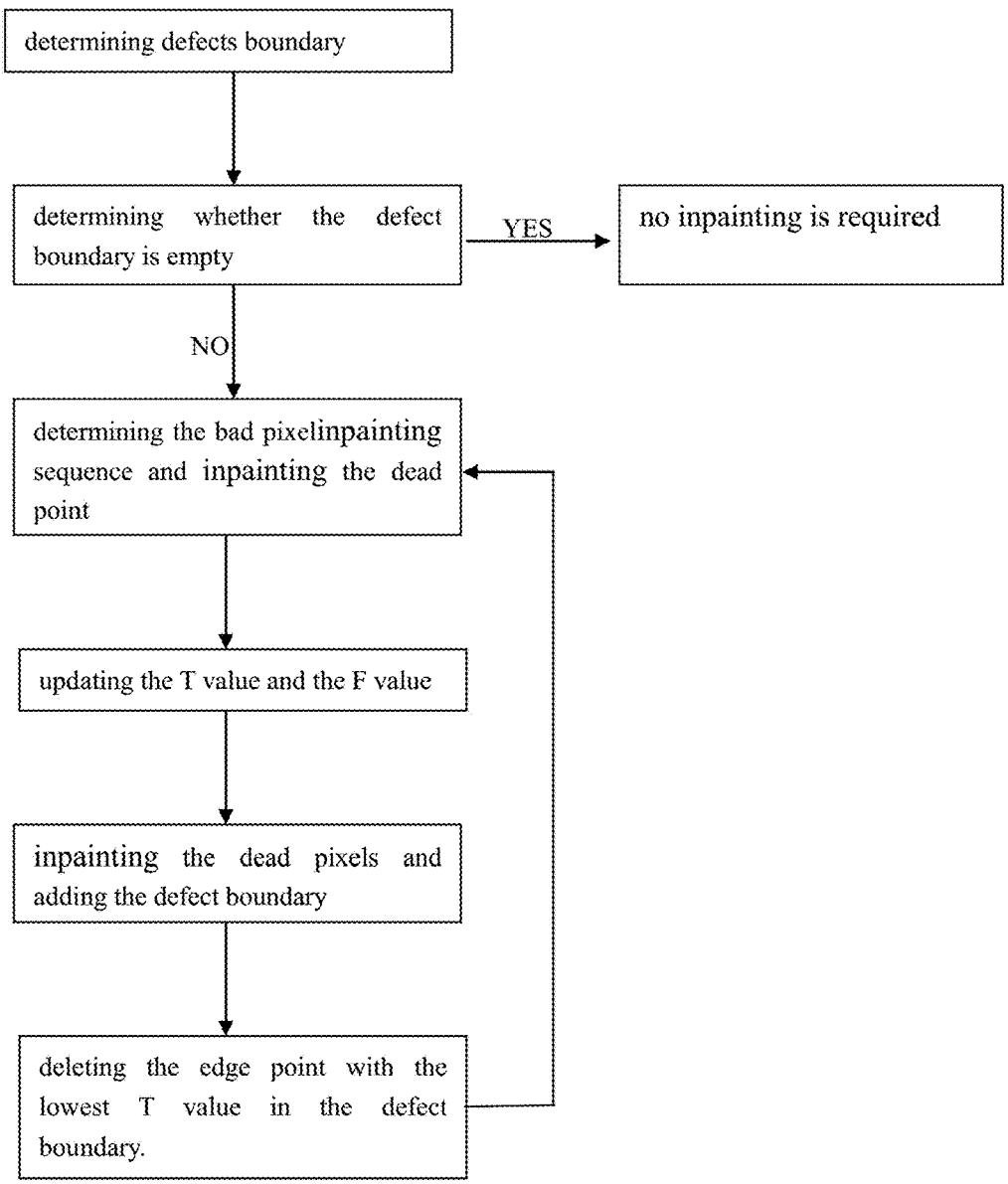
FIG. 5 is a flowchart showing the inpainting method according to another preferred embodiment of embodiment 3 of the present disclosure.

In another preferred embodiment, as shown in FIG. 5, the inpainting step further includes: after inpainting the determined dead pixels, updating the T value and the F value of the inpainted dead pixels, adding the inpainted dead pixels into the defect boundary, and deleting the edge point with the lowest T value in the defect boundary.

Figure 6A:
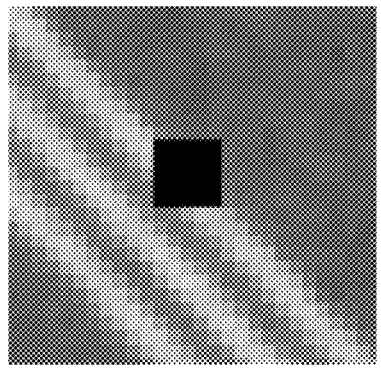
FIG. 6*a* shows the defect image with a cluster defect.
Figure 6B:
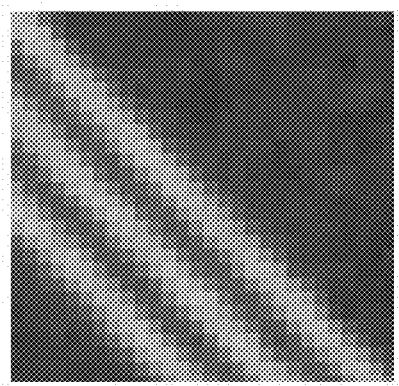
FIG. 6*b* shows the image inpainted according to the method in embodiment 3.

As shown in FIG. 6a, the black area is a cluster defect in the image, and FIG. 6b is an inpainted image obtained by inpainting the cluster defect in FIG. 6a by method abovementioned in the embodiment. Thus, the method of the present embodiment inpaints the cluster defects in the image, and the edges of the image are very sharp.

Embodiment 4

On the basis of embodiment 1, the present embodiment provides a method for inpainting bad line defects. The method uses the template matching method provided in embodiment 3, and inpaints according to the position of the bad points of the bad line defects stored in the connected domain analysis.

In a preferred embodiment, the sequence of inpainting the bad lines is generally from left to right and from top to bottom. In the present embodiment, the search area for the bad line defects needs to avoid the area of the bad line.

In another preferred embodiment of the embodiment, the search template needs to be adaptively changed according to the width of the bad line in the image.

Figure 7A:
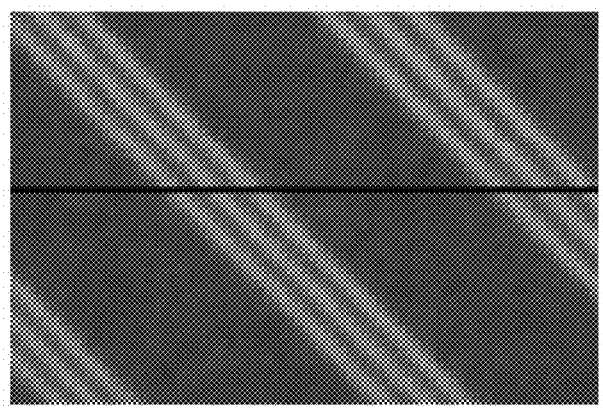
FIG. 7*a* shows the defect image with a bad line defect.
Figure 7B:
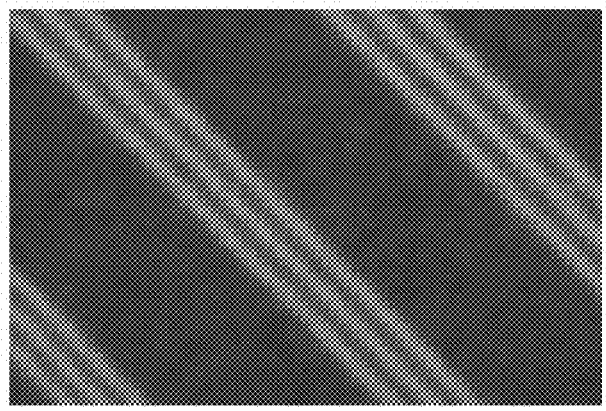
FIG. 7*b* shows the image impainted according to the method in the embodiment 4.

As shown in FIG. 7a, the black horizontal line in the image is the bad line defect in the image, and FIG. 7b shows the inpainted image by inpainting the bad line defects in FIG. 7a through using the template matching method. Thus, the method of the present embodiment well inpaints the bad line defects in the image, the bad lines are effectively inpainted, and the details of the image are well preserved.

Embodiment 5

Figure 8:
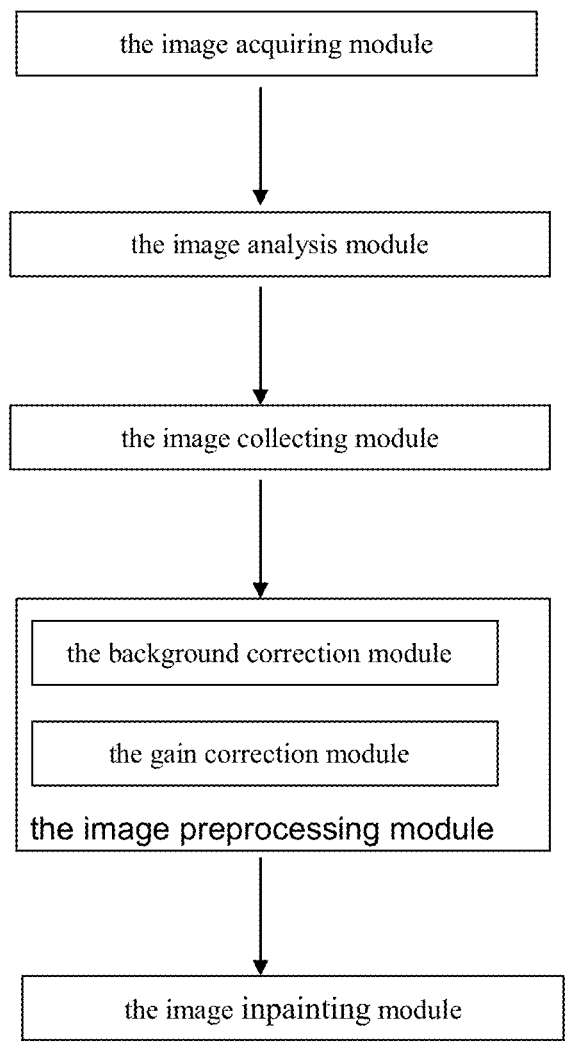
FIG. 8 is a schematic diagram showing an image processing system according to embodiment 5 of the present disclosure.

The present embodiment provides an image inpainting system. As shown in FIG. 8, the system includes an image acquiring module for acquiring a first image, an image analyzing module, used for performing connected domain analysis to the first image acquired by the image acquiring module, and extracting the defective pixels in the first image, and classifying the defective pixels into three types according to the size and shape of the connected domain: isolated point defects, cluster defects and bad line defects; and the image inpainting module, used for inpainting the second image according to the type of the defective pixel determined by the image analysis module.

In a preferred embodiment, as shown in FIG. 8, the image inpainting system further includes an image acquiring module that reads, amplifies, and performs analog-to-digital conversion on the second image signal, and then the amplified and converted image signal is transmitted to the image processing module of the image inpainting system for the subsequent inpainting.

In another preferred embodiment, as shown in FIG. 8, the image inpainting system further includes an image preprocessing module, the image preprocessing module includes a background correction module and a gain correction module, respectively performing background correction and gain correction to the second image.

Embodiment 6

Figure 9:
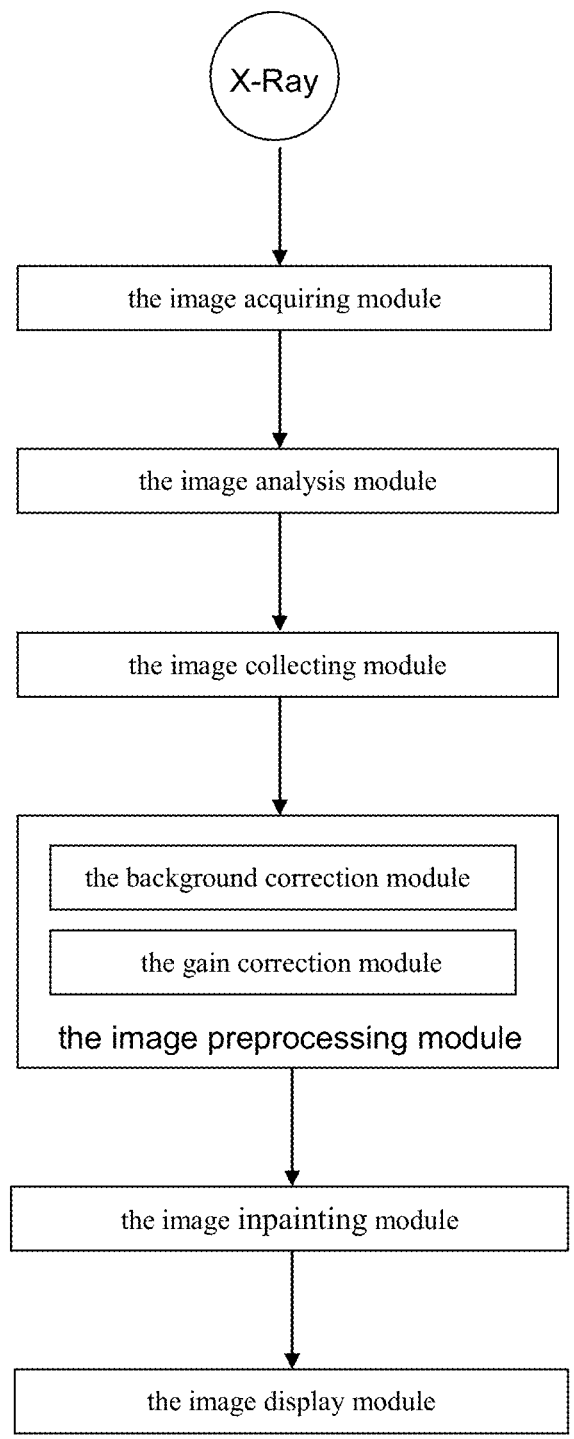
FIG. 9 is a schematic diagram showing a flat panel detector provided in embodiment 6 of the present disclosure.

The embodiment provides a flat panel detector, as shown in FIG. 9, the flat panel detector includes the image inpainting system described in Embodiment 5, and the image inpainting system is integrated in the flat panel detector.

As shown in FIG. 9, the flat panel detector further includes an image display module, and the image display module outputs and displays the inpainted image.

In a preferred embodiment, the image collecting module of the flat panel detector includes a scintillator, a thin film transistor (TFT) and a photodiode array, and the scintillator may include cesium iodide, or other scintillators commonly used in the art. The scintillator converts X-rays into visible light, and then the TFT and the photodiode array convert the visible light into an electrical signal. The electrical signal is transmitted to the image processing module after being read, amplified, and analog-to-digital converted. The image processing module inpaints the formed image.

In summary, the flat panel detector of the embodiment integrates an image inpainting system, and the hardware design thereof does not change, thereby reducing the design and production cost of the product and improving the shipping yield. In the subsequent upgrade and maintenance, only the software is required to be optimized and upgraded.

As described above, the image inpainting method, system, detector, server, and computer readable storage medium provided by the above embodiments have the following beneficial effects.

1. The method in the present disclosure performs statistics and analysis on defective pixels in a first image, such as a defect template in a detector, sorts the defective pixels, and inpaints the second image in the order of defective pixels from small to large. Different defective pixels are inpainted by different methods. The inpainting method takes into account the similarity of adjacent pixels and conforms to the distribution characteristics of the image gray scale, which not only can effectively inpaint the defective pixels, but also well preserve the details of the original images.

2. The method in the present disclosure performs pixel statistics and classification on the defect template in the detector, and inpaints the image outputted by the detector in real time according to the classification, so that the image defect pixel can be quickly inpainted.

3. The image inpainting method in the present disclosure only relates to the type of defective pixel, such as a dead pixel defect, a cluster defect, and a bad line defect, which can be used in flat panel detectors, so it can significantly improve work efficiency and reduce the labor costs.

4. The image inpainting system in the present disclosure can be integrated in a flat panel detector without required changes to the hardware design, which can reduce product cost and improve shipment yield. And in the subsequent upgrade and maintenance, only the software is required to be optimized and upgraded.

The above-described embodiments are merely illustrative of the principles of the present disclosure and the advantages thereof, and are not intended to limit the present disclosure, and various modifications and changes can be made by those skilled in the art without departing from the spirit and scope of the disclosure, such as the size and coefficient of the domain weighted template, changing the size of the template matching, changing the data related parameters used in the template matching, changing the level set to control the restore order, or using the same idea of the present disclosure to perform the neighboring domain weighted average, the level set control and the template matching restores defective pixels and the like to restore defective pixels. Such modifications and variations are intended to be included within the scope of the appended claims.

The invention claimed is:

1. An image inpainting method, including the following steps:
 obtaining a first image;
 performing a connected domain analysis on the first image to extract defective pixels in the first image;
 classifying the defective pixels into three types according to the size and shape of the connected domain: isolated point defects, cluster defects, and bad line defects; and
 outputting a second image and inpainting the second image according to the type of the defective pixel, wherein the isolated point defects, cluster defects, and bad line defects of the second image are sequentially inpainted in the same order they are listed;
 wherein the isolated point defects are inpainted by using a neighborhood weighted average method, and the inpainted pixel gray scale is as follows:

$$G(x, y) = \sum_{i,j \in N}^{N} F(i, j) * K(i, j);$$

wherein F is original image data of the isolated point defects in a 3×3 pixel neighborhood, N is the number of normal pixel points in the 3×3 pixel neighborhood of the isolated point defects, and K is a weighted average coefficient of the normal pixel points in the 3×3 pixel neighborhood of the isolated point defects.

2. The image inpainting method according to claim 1, wherein a source of the weighted average value includes:
 a gray scale distribution of the normal pixel points in the 3×3 pixel neighborhood, wherein the gray scale distribution is calculated by a gray level gradient of the normal pixel point, the normal pixel point with a large gradient value has a large weighted coefficient, while the normal pixel point with a small gradient value has a small weighted coefficient;
 a position distribution of all the normal pixel points in the 3×3 pixel neighborhood, wherein the position distribution is calculated by a distance from the normal pixel point to the isolated defect point, the weighted coefficient of the normal pixel point having short distance is high, while the weighted coefficient of the normal pixel point with a long distance is low.

3. The image inpainting method according to claim 1, wherein the cluster defect is inpainted by combining a level set method and a template matching method, the level set method determines the inpainting sequence of bad pixels in the cluster defects;
 the template matching method inpaints the current bad pixel.

4. The image inpainting method according to claim 3, wherein determining the inpainting sequence of the bad pixels in the cluster defects includes the following steps:
 extracting the cluster defects and determining a defect boundary of the cluster defects, initializing a defect flag F and a arrival time T, and marking normal pixel points, edge points and defect points of the defects boundary;
 determining the edge point with the lowest T value in the defect boundary;
 determining the bad pixel in the 3×3 pixel neighborhood of the edge point with the lowest T value, and the bad pixel in the 3×3 pixel neighborhood of the edge point with the lowest T value is the current bad pixel required to be inpainted.

5. The image inpainting method according to claim 4, wherein the inpainting the current bad pixel includes the following steps:
 selecting a target template using the current bad pixel as the center;
 selecting a search area using the current bad pixel as the center;
 selecting a search template of the same size as the target template in the search area, calculating a similarity between the target template and the search template, and storing the calculation result;
 searching for the most similar data in the calculation results, and replacing the pixel value of the current bad pixel with the central pixel value of the search template corresponding to the data with the most similarity.

6. The image inpainting method according to claim 5, further including the following steps:
 determining whether the defect boundary is empty, if so, no inpainting is required;
 if not, performing an inpainting step, the inpainting step inducing determining the inpainting sequence of the bad pixels of the cluster defects and inpainting the determined bad pixel;
 performing the above determining step and inpainting step repeatedly until the defect boundaries become empty.

7. The image inpainting method according to claim 6, wherein the inpainting step further includes:
 updating the T value and the F value of the inpainted bad pixels after the inpainting of the determined bad pixels;
 adding the inpainted bad pixels into the defect boundary, and deleting the edge point with the lowest T of the defect boundary.

8. The image inpainting method according to claim 1, wherein the bad line defect is inpainted by a template matching method, and is inpainted according to a sequence of stored positions in the connected domain analysis of dead line defects.

9. The image inpainting method according to claim 8, wherein a searching area avoids the area where the bad line defect is located when the bad line defect is inpainted, and a searching template changes adaptively according to the width of the bad line defects.

10. The image inpainting method according to claim 1, further includes performing a background correction and a gain correction on the second image before inpainting.

11. An image inpainting system, including:
 an image acquiring module, acquiring a first image;
 an image analysis module, performing connected domain analysis on the first image acquired by the image acquiring module, and extracting the defective pixels in the first image, wherein the pixels are classified into three types according to the size and shape of the connected domain: isolated point defects, cluster defects, and bad line defects; and
 an image inpainting module, inpainting a second image according to the type of the defective pixels determined by the image analysts module, wherein the isolated point defects, cluster defects, and bad line defects of the second image are sequentially inpainted in the same order they are listed;

wherein the isolated point defects are inpainted by using a neighborhood weighted average method, and the inpainted pixel gray scale is as follows:

$$G(x, y) = \sum_{i,j \in N}^{N} F(i, j) * K(i, j);$$

wherein F is original image data of the isolated point defects in a 3×3 pixel neighborhood, N is the number of normal pixel points in the 3×3 pixel neighborhood of the isolated point defects, and K is a weighted average coefficient of the normal pixel points in the 3×3 pixel neighborhood of the isolated point defects.

12. The image inpainting system according to claim 11, further including an image collecting module performing signal reading, amplification, and analog-to-digital conversion on the second image, and transmitting the amplified and converted image signals to the image inpainting module.

13. The image inpainting system according to claim 12, further including an image preprocessing module, wherein the image preprocessing module includes a background correction module and a gain correction module, the background correction module performs the background correction on the second image, and the gain correction module perform the gain correction on the second image.

14. A flat panel detector, including an image display module and the image inpainting system in claim 11, wherein the image inpainting system is integrated in the flat panel detector, the image display module outputs and displays the images inpainted by the image inpainting system.

* * * * *